United States Patent [19]

Rej et al.

[11] Patent Number: 5,411,123
[45] Date of Patent: May 2, 1995

[54] CARTRIDGE BALL CHECK VALVE HAVING INTEGRAL FILTER FOR AN AUTOMATIC TRANSMISSION CLUTCH

[75] Inventors: Dawn A. Rej, Plymouth; Carlton J. Fendt, Jr., Livonia, both of Mich.

[73] Assignee: Ford Motor Company, Dearborn, Mich.

[21] Appl. No.: 172,800

[22] Filed: Dec. 27, 1993

[51] Int. Cl.[6] .................. F16D 25/0638; F16D 25/12
[52] U.S. Cl. ........................... 192/85 AA; 192/106 F
[58] Field of Search ............ 192/85 AA, 85 R, 106 F

[56] References Cited

U.S. PATENT DOCUMENTS 4,635,778  1/1987  Lederman ..................... 192/85 AA
4,724,745  2/1988  Sumiya et al. ............ 192/85 AA X
4,964,506 10/1990  Benford et al. ................. 192/106 F
5,137,624  8/1992  Klotz ........................... 192/106 F X Primary Examiner—Richard M. Lorence
Attorney, Agent, or Firm—Frank G. McKenzie; Roger L. May

[57] ABSTRACT

A friction clutch (10) for an automatic transmission includes a hydraulic cylinder (36), a clutch piston (40) movable within the cylinder, sets of friction discs (18, 54), one set drivably connected to the clutch cylinder and a second set drivable connected to another clutch member, a pressure plate (60), hydraulic passages (28, 30, 32, 34) connecting a fluid pressure source and the cylinder, a ball check valve (64) carried on the piston, and a filter screen (80) supported on a check valve cartridge (68) between the cylinder and clutch discs.

4 Claims, 2 Drawing Sheets

CARTRIDGE BALL CHECK VALVE HAVING INTEGRAL FILTER FOR AN AUTOMATIC TRANSMISSION CLUTCH

BACKGROUND OF THE INVENTION

1. Field of the Invention

This invention relates to an hydraulically actuated friction element such as a clutch or brake for use in an automatic transmission of a motor vehicle.

2. Description of the Prior Art

Ball check valves are used in the hydraulic circuit of an automatic transmission to permit one-way flow of hydraulic fluid to friction elements that control operation of planetary gear units. These check valves are susceptible to blockage caused by contaminants entrained in the hydraulic fluid supplied to the check valve.

It is conventional practice to include a rather coarse filter located in the sump of the transmission, through which filter hydraulic fluid passes as it is drawn from the sump by a hydraulic pump that supplies pressurized hydraulic fluid to the control and actuation system of the transmission. Despite the use of hydraulic filters located in the sump, correct actuation of hydraulic clutches and brakes is compromised when contaminants carried by the hydraulic fluid adversely affect operation of the ball check valves associated with the friction clutches and brakes. Attempts have been made to attach a filter onto a cartridge ball check assembly by a snap fit or press fit or by staking the filter directing to a clutch or brake piston. Snap fitting or staking a filter requires additional complexity, an additional manufacturing operation, and increase in cost.

It is preferable to locate a fluid filter directly over the cartridge assembly that contains the ball check valve so that the filter blocks contaminant present in the hydraulic fluid near the hydraulic clutch or brake. The contaminants are filtered before reaching the cartridge assembly and before they affect adversely correct operation of the check valve.

SUMMARY OF THE INVENTION

To overcome these difficulties and to provide an hydraulic clutch or brake controlled by operation of a ball check valve, according to the present invention, a cartridge assembly containing a ball check valve includes a filter screen molded integrally with the cartridge, the filter mesh being so fine as to eliminate passage of contaminants past the filter that are large enough to adversely affect the correct operation of the ball check valve or friction element.

An hydraulic friction element according to this invention includes an hydraulic cylinder connected by various hydraulic passages to a source of regulated hydraulic fluid pressure. The cylinder is pressurized and vented as required to engage and disengage the friction element. A piston is located within the cylinder for axial displacement in accordance with the pressurized and vented state of the cylinder. A compression return spring opposes the effect of hydraulic fluid and forces the piston to return to the vented position when hydraulic pressure is removed from the cylinder.

A first set of friction discs is drivably connected to a first member of the friction element, and a second set of friction discs, each interposed between the discs of the first set, are drivably connected to a second member of the friction element. A pressure plate is supported and held against displacement so that it provides a reaction to the hydraulic pressure developed on the clutch piston, which is moved axially due to pressurized hydraulic fluid and forces the friction discs into mutual driving contact.

Several check valve cartridges are located within axial holes formed at angularly spaced positions in the piston. Each cartridge includes a valve seat and a spherical ball located within the cartridge sized to contact the valve seat and thereby to close the cartridge against fluid flow. A filter screen is located on the end of a cartridge passage adjacent a radial flange on the cartridge. The filter is molded in position on the cartridge by a frame, which is held in position on the cartridge by engaging the radial flange thant extends from the outer surface of the cartridge.

DESCRIPTION OF THE PREFERRED EMBODIMENT

Figure 1:
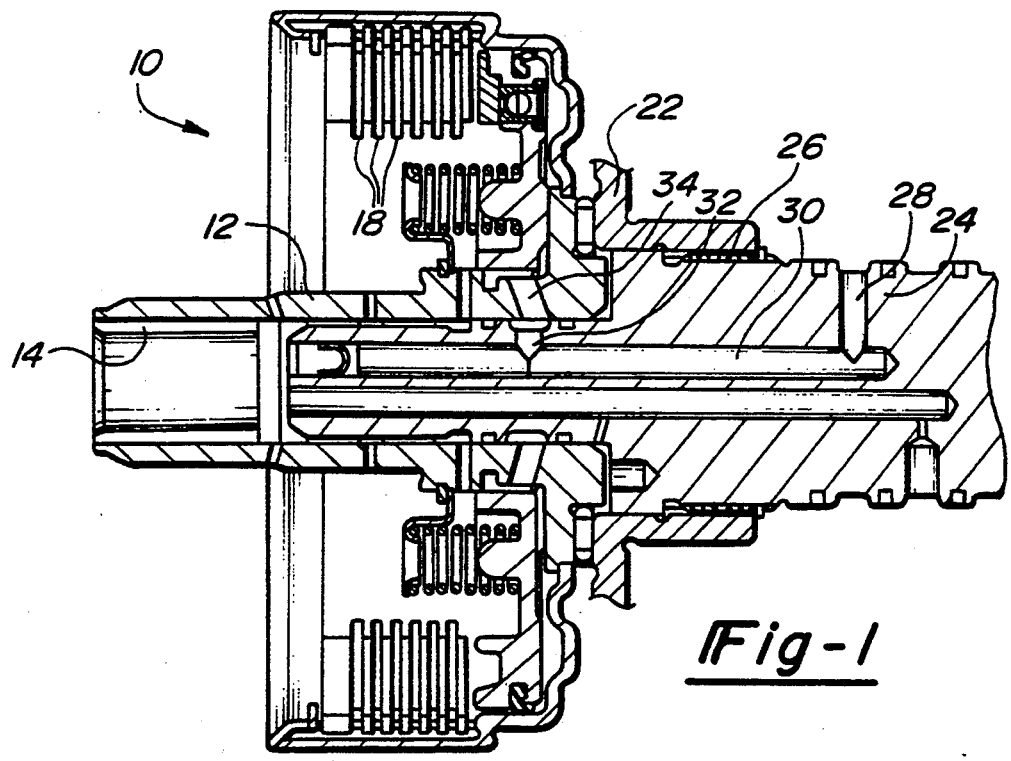
FIG. 1 is a cross section through a portion of an automatic transmission in the vicinity of an hydraulically actuated friction clutch suitable for use with this invention.

FIG. 1 shows the components of an automatic transmission located in the vicinity of an hydraulically actuated friction clutch, which is engaged alternately to produce a drivable connection between members of the clutch when pressurized hydraulic fluid is supplied and is disengaged to release the drive connection when fluid pressure is vented.

A first member 12 of the clutch includes an axially extending sleeve shaft having an internal spline 14, by which member 12 is drivably connected to another shaft of the transmission, which extends leftward or forward toward the front of the transmission. The second member 16 clutch, not shown in FIG. 1 but illustrated in FIG. 2, is engaged with a set of six friction discs 18 and is connected by a spline 20 to components of a planetary gearset also located to the left of clutch 10.

A torque transfer member 22 drivably connects the output shaft 24 through a spline connection 26 to other components of the planetary gear units of the transmission. Hydraulic fluid from a fluid pressure source is supplied through passages 28, 30, 32, and 34 to the clutch.

Figure 2:
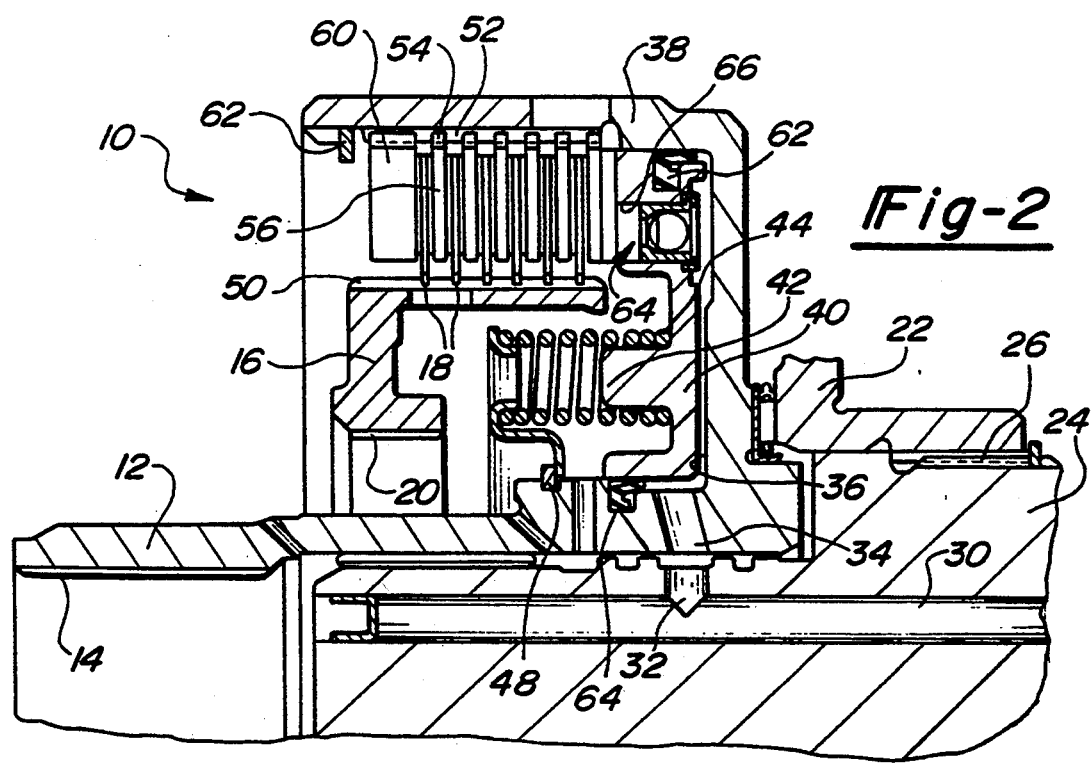
FIG. 2 is a partial cross section of the clutch assembly of FIG. 1 showing the components of the clutch in greater scale and detail.

Referring now to FIG. 2, the inner surface of first clutch member 12 defines an hydraulic cylinder 36 having axially extending walls 38 along which a clutch piston 40 moves in response to the pressurized and vented state of that portion of cylinder 36 located between piston 40 and member 12. The piston defines several annularly spaced bosses 42, which locate, support and guide compression springs 44. Located at the axially opposite end of the springs is a spring support (not numbered), fixed in position by a snap ring 48 fitted in a groove on the inner surface of member 12. Springs 44 are compression springs that operate to force piston 40 rightward against the effect of hydraulic pressure in cylinder 36.

Member 16 is fixed in position axially and radially against displacement. The radially outer surface of member 16 is formed with an external spline 50, which engages internal splines formed on the radially inner surfaces of friction discs 18. Discs 18 are adapted to move axially along member 16 in response to the application of hydraulic pressure to piston 40.

Member 12 is formed with an internal spline 52, which is engaged by external splines 54 formed on the outer surfaces of friction discs 56, each of which are located between adjacent friction discs 18. A pressure plate 60, engaged with spline 52, provides a reaction to the axial force applied by piston 40 to the arrangement of stacked friction discs plates due to contact with snap ring 62 fixed to clutch member 12.

Piston 40 is formed with a recess within which is fitted a dynamic hydraulic seal 62, which maintains elastic contact with the inner surface of clutch member 12 to prevent the passage of hydraulic fluid therepast. Similarly, hydraulic seal 64, fitted within a recess on the inner surface of member 12, maintains elastic contact with the outer surface of piston 40 to prevent passage of hydraulic fluid.

Ball check valve 64 is located within an axially directed cylindrical hole 66 formed through the thickness of piston 40. Several holes 66, each containing a check valve 64, are distributed angularly about the axis of the clutch.

Figure 3:
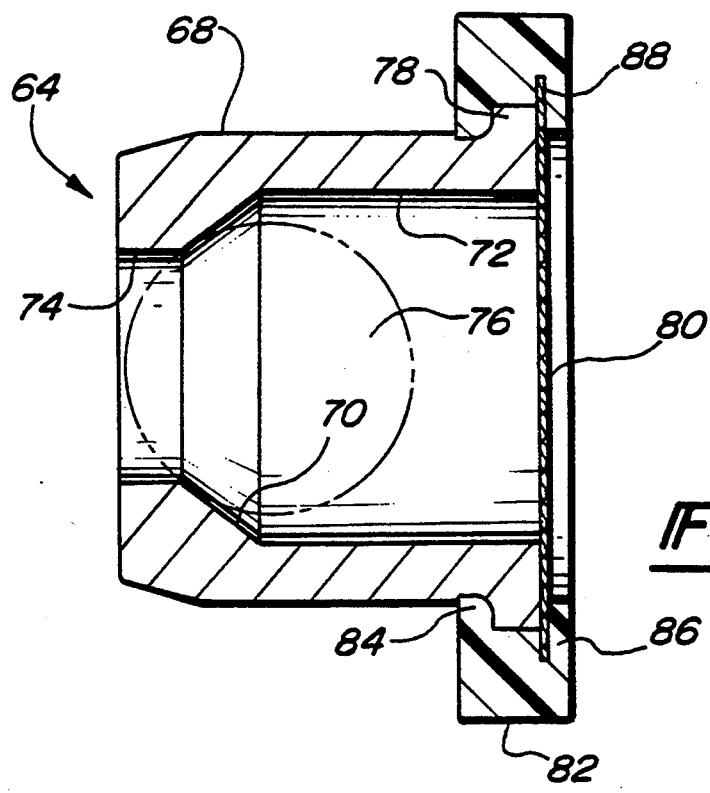
FIG. 3 is a cross section of a cartridge filter for use with the clutch of FIGS. 1 and 2.
Figure 4:
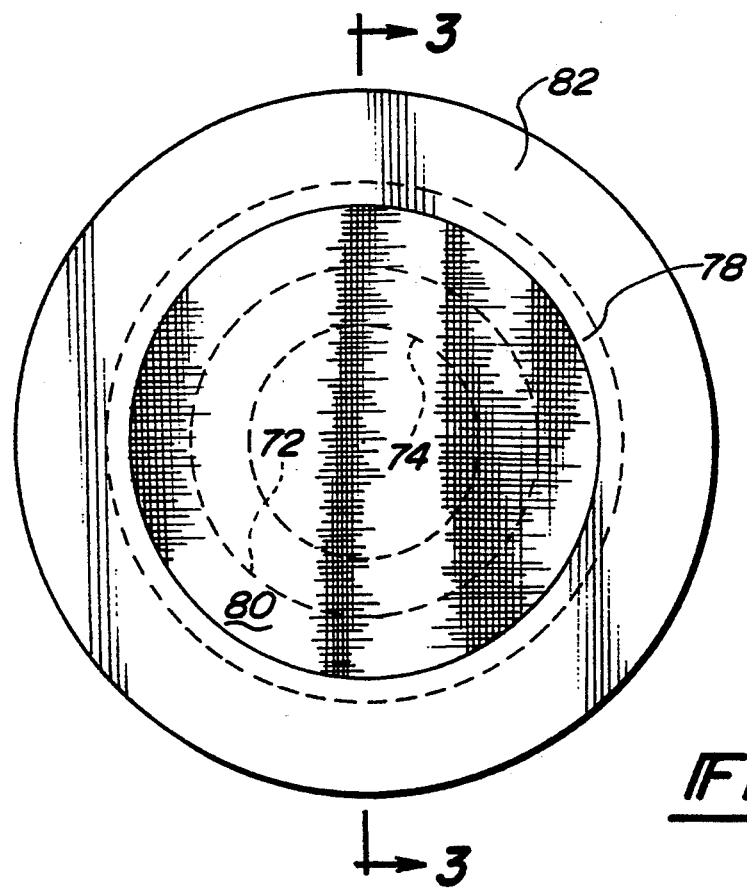
FIG. 4 is an end view of the filter of FIG. 3.

As FIGS. 3 and 4 show in greater detail than does FIG. 2, valve 64 includes a metal cartridge 68 having a cylindrical outer surface adapted to fit with a slight press fit securely within the cylindrical surface of hole 66 formed on piston 40. The inner and outer surfaces of cartridge 68 are machined, the inner surface being formed with a conical surface 70 located between cylindrical surfaces 72 of passages 74, through which hydraulic fluid can flow depending upon the location of a spherical ball 76, which is adapted to seat on the conical surface 70 to prevent the passage of hydraulic fluid. Ball 76 can move rightward out of engagement on its valve seat to permit hydraulic fluid to flow rightward past the valve seat 70 into cylinder 36 and through hydraulic passages 28, 30, 32, 34 when hydraulic pressure is vented from those passages.

The right-hand end of passage 72 is open, and the outer surface of cartridge 68 is formed with a radially extending flange 78. A filter screen 80, having a fine mesh whose maximum opening is of the order of 0.01 mm of nylon material, is located over the otherwise open end of passage 72.

A frame 82 formed of Nylon, includes first and second radial flanges 84, 86, which are located on opposite axial sides of flange 78 formed on cartridge 68. The Nylon frame 82 is molded in place so that it envelopes that portion of filter 80 that is adjacent the radially outer edge 88 of screen 80.

The method for fabricating the check valve includes the steps of machining cartridge 68, placing ball 76 within the cartridge, placing the filter screen 80 on the axial face of flange 78, and injection molding frame 82 in the position of FIG. 3 so that it straddles flange 78 and envelopes the edge of filter screen 80. The ball check valve is then located with a slight press fit within the opening 66 formed in the clutch piston 40.

Hydraulic fluid is supplied to cylinder 36 through hydraulic passages 28, 30, 32, and 34 from a source of regulated hydraulic pressure whose magnitude is suitable to engage clutch 10. The pressure force that develops on the face of piston 40 forces the piston leftward against the two sets of clutch discs 18, 54, until the clutch discs are forced into mutual frictional contact. This action drivably connects clutch member 12 and member 16. Hydraulic pressure in cylinder 36 forces ball 76 to a seated position on cartridge 68, thereby closing and sealing the clutch cylinder. Hydraulic fluid entering the cartridge is filtered through screen 80 to prevent passage of contaminants that may be contained in the hydraulic fluid.

When the hydraulic supply passages are vented, clutch return spring 44 forces clutch piston 40 rightward, thereby frictionally disengaging the two sets of friction discs and allowing ball 76 to become unseated within cartridge 68. When this occurs, hydraulic fluid located within the cartridge flows rightward through the filter screen and returns to the hydraulic system.

Having described a preferred embodiment of our invention, what we claim and desire to secure by U.S. Letters Patent is:

1. A friction element for engaging and releasing a drive connection between first and second members of the friction element operated by hydraulic fluid, comprising:
   a cylinder;
   passages for pressurizing and venting the cylinder;
   a first set of friction discs driveably connected to the first member;
   a second set of friction discs driveably connected to the second member, each disc of the second set of friction discs located between a disc of the first set of friction discs;
   a piston located in the cylinder for displacement along the cylinder, applying force to the friction discs, thereby producing a drive connection therebetween, having an opening therethrough;
   a check valve means supported on said piston, located in said opening, for closing the check valve means when the cylinder is pressurized; and
   filter means fixed to the check valve, located between the check valve and cylinder for preventing passage of contaminants present in the fluid.

2. The friction element of claim 1 wherein the check valve includes:
   a cartridge fitted within the opening of the piston, defining a valve seat and a passage extending through the cartridge;
   a ball located in the cartridge passage, adapted to close the passage by contacting the valve seat;
   a filter located at an end of the passage having an outer edge; and
   a frame enveloping a portion of the filter adjacent the outer edge of the filter and fixing the filter to the frame, held on the cartridge against displacement relative to the frame.

3. The friction element of claim 1 wherein the filter means comprises a screen having a fine mesh.

4. The check valve of claim 2 wherein:
   the cartridge includes a radial flange formed on a surface located adjacent the filter; and
   the frame is moulded in place over the flange and the portion of the filter adjacent the outer edge of the filter.

* * * * *